Oct. 25, 1960
G. CAMILLI ET AL
2,957,938
ELECTRICAL APPARATUS AND DIELECTRIC MATERIAL THEREFOR
Original Filed July 29, 1955
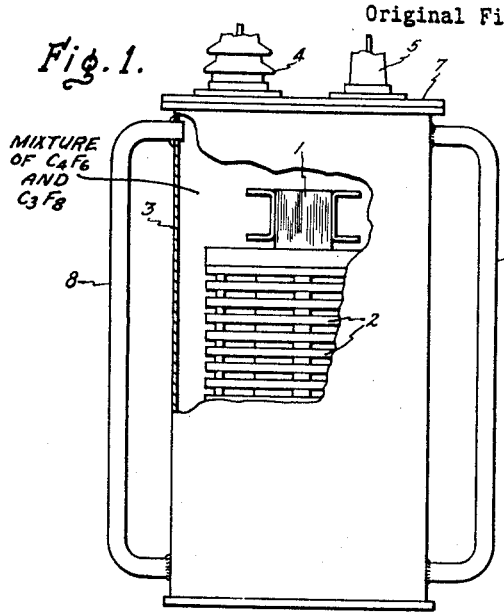
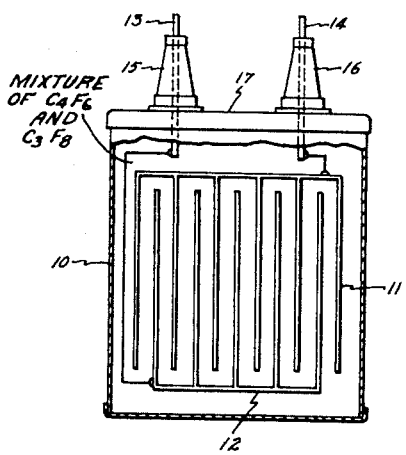
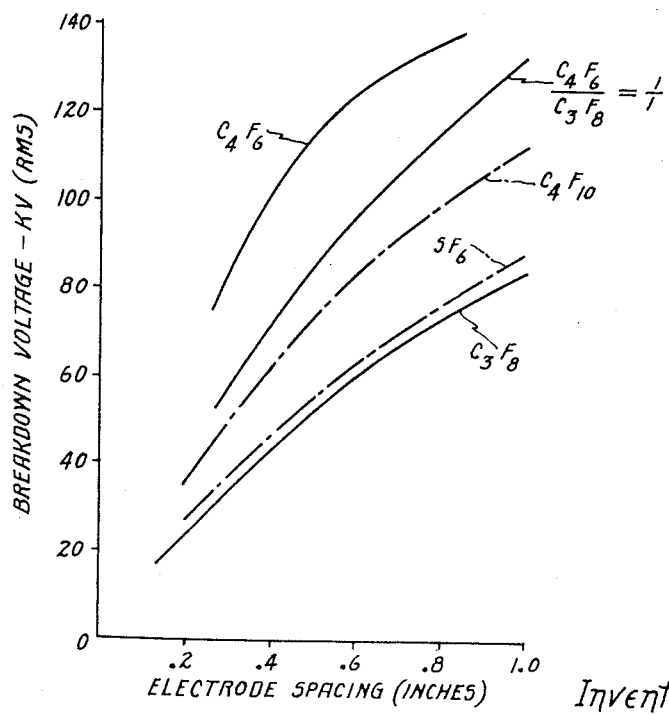
Inventors.
Guglielmo Camilli,
Tseng W. Liao,
Ralph E. Plump,
by Gilbert P. Tarleton
Their Attorney.

United States Patent Office 2,957,938
Patented Oct. 25, 1960

2,957,938

ELECTRICAL APPARATUS AND DIELECTRIC MATERIAL THEREFOR

Guglielmo Camilli, Pittsfield, Mass., Tseng Wu Liao, Media, Pa., and Ralph E. Plump, Pittsfield, Mass., assignors to General Electric Company, a corporation of New York Continuation of application Ser. No. 525,128, July 29, 1955. This application Nov. 3, 1959, Ser. No. 850,732

11 Claims. (Cl. 174—17)

The present invention relates to dielectric material, and more particularly to gaseous electrical insulating material and electrical apparatus utilizing the same.

This application is a continuation of application Serial No. 525,128, filed July 29, 1955, now abandoned, and assigned to the same assignee as the present application.

The use of gaseous dielectric media for electrical apparatus, particularly in high voltage transformers, has been found preferable in many cases to liquid dielectrics, which are in some cases inflammable or subject to degradation of their insulating characteristics by oxidation effects and various contaminants. Of the two types of insulation, gases possess an advantage over liquids in that less weight of material need be employed in the system, and consequently, the overall weight of electrical apparatus utilizing gaseous dielectrics is substantially less. Also, in the case of internal failures, the chance of explosion is considerably reduced because of the compressibility of gases. Other advantages are that gaseous dielectrics are not flammable, reduce the transmission of sound, have better heat transfer properties, and require less power consumption in forced circulation of the dielectric for cooling purposes, due to lower viscosity and density.

Various gaseous compounds have previously been suggested for use as transformer dielectrics, such as sulfur hexafluoride and halogen-combined hydrocarbons. The previously used gaseous dielectrics have, however, been subject to various disadvantages as, for example, thermal degradation at elevated temperature, insufficient dielectric strength especially at high voltages and high temperature, having boiling points which are too high to insure adequate insulation protection at low temperatures, and in the case of certain gases are too expensive to use in the quantities necessary for proper protection.

It is an object of the present invention to provide electrical apparatus, such as transformers and capacitors, and gaseous dielectric material therefor, which overcomes the above-mentioned disadvantages of the prior art gaseous dielectric materials.

It is another object of the invention to provide a composite gaseous dielectric medium which possesses high dielectric strength, adequate thermal stability, low boiling point, is economical to use in large quantities, affords adequate insulation protection under a wide range of temperature and pressure, and provides good heat transfer.

It is another object of the invention to provide for use in electrical apparatus of the above type a gaseous dielectric medium which is particularly characterized by superior dielectric strength and has suitable physical and other characteristics making it of practical use in a wide variety of such electrical apparatus.

As indicated above, an important property desirable in an insulating gas is that it be gaseous at as low a temperature as possible, particularly for use in transformers and other electrical apparatus operating outdoors in cold climates. This is important so that the gas will not condense and settle at the bottom of the apparatus, thus causing loss of pressure resulting in a reduction of electrical insulation.

It has been found in accordance with one aspect of the invention that the above advantages and a particularly satisfactory gaseous dielectric material are produced by a mixture of fluorocarbon gases, and in particular a mixture of $C_4F_6$, hexafluorobutyne-2, and $C_3F_8$, octafluoropropane, used as a dielectric medium in an enclosed electrical apparatus such as a transformer or capacitor.

The invention in another aspect contemplates the use of $C_4F_6$ alone or in gas dielectric mixtures other than the above-described mixture.

The invention will be better understood from the following description taken in conjunction with the accompanying drawing in which:

Fig. 1 is a view partly in section schematically illustrating a dry-type transformer adapted to contain a gaseous insulation material in accordance with the invention;

Fig. 2 illustrates a capacitor adapted to incorporate the present gaseous dielectric medium; and Fig. 3 graphically illustrates the electrical characteristics of the present gaseous dielectric medium as compared to other insulating gases.

Shown in Fig. 1 is a transformer having a core 1 on which are wound a plurality of inductively-related electrical windings 2 in accordance with conventional transformer construction. The core 1 and windings 2 are immersed in the gas dielectric medium of the present invention which is contained within the tank 3 of the transformer. The gas-tight housing 3 is fitted with a removable cover 7 which is provided with a pair of bushings 4 and 5 through which the external terminals extend. Also provided on the transformer are cooling conduits 8 and 9 through which the gas circulates, the gas dielectric being circulated by a pump (not shown) in accordance with known construction. The transformer may also contain means for removing corrosive products in case of accidental arcing in the gas, e.g., a granular absorbent such as alumina, soda lime, or other material.

Figure 2 illustrates a capacitor which may incorporate the present electrical insulating material. The capacitor, as conventionally shown in Fig. 2, comprises a casing 10 in which are mounted spaced armatures 11 and 12 suitably supported within the casing. The armatures may be maintained in proper operative relation by spacers (not shown) comprising suitable insulating material. The respective spaced sets of capacitor plates are connected to external terminals 13 and 14 which are provided with insulators or bushings 15, 16. Within the capacitor casing 10, a dielectric material comprising the present gaseous mixture fills the interior space.

A preferred form of the invention wherein the gas dielectric comprises a mixture of $C_4F_6$ and $C_3F_8$ is shown in the drawing, but as indicated above, the gaseous medium may comprise $C_4F_6$ alone or in other mixtures.

It will be understood that the advantages of the present invention are not confined to the electrical devices illustrated but may be obtained in other electrical apparatus, such as X-ray tube housings, bushings, and gas-filled cables.

In the graph of Fig. 3, there is plotted the breakdown strength of various gaseous dielectric materials including that of the present invention. The curves in the graph plot the 60 cycle breakdown voltage in kilovolts (root mean square) of the various gases in a 3″ diameter round-edged plane-to-plane gap at various electrode spacings given in inches, and at atmospheric pressure.

Shown in dot-dash lines on the graph are two gases $SF_6$, sulfur hexafluoride, and $C_4F_{10}$, perfluoro-n-butane, which are prior known gaseous dielectric media. $SF_6$, which has been widely used heretofore, has certain advantages such as low cost, very low boiling temperature (−62° C. at atmospheric pressure) and relatively high dielectric strength as compared to either nitrogen or air. However, it does not have adequate insulating strength to allow the high voltage gradients to which present transformer design tends nor satisfactory thermal stability in the presence of various constructional materials under the higher operating temperatures to which such transformers may be raised. On the other hand, $C_4F_{10}$ which has a much superior dielectric strength relative to $SF_6$ and certain other known gaseous dielectric materials has a boiling point of only −2.5° C. at atmospheric pressure, which is much too high for general outdoor use in transformers.

We have now found that $C_4F_6$ (hexafluorobutyne-2) not only has a higher dielectric strength than $C_4F_{10}$, but also has a boiling point of −23° C., considerably lower than that of $C_4F_{10}$. As shown in Fig. 3, the dielectric strength of $C_4F_6$ is of the order of twice that of $SF_6$.

Based on previous experience with the properties of known dielectric gases, the remarkably high dielectric strength of $C_4F_6$ was quite unexpected. For example, in general, the higher the dielectric strength of the gas, the higher is its boiling point. On this basis, $C_4F_6$ with a boiling point of −23° C. would be expected to have a dielectric strength less than that of $C_4F_{10}$ (B.P. −2.5° C.) and somewhat higher than that of $C_3F_8$ (B.P. −37° C.), but in fact a remarkable improvement over these gases was found, as shown in Fig. 3.

It has also been found in the past that the dielectric strength of fluorocarbons is related to their molecular weight, i.e., high dielectric strength is associated with high molecular weight. Nevertheless, $C_4F_6$ with a molecular weight of 162 as compared to $SF_6$ with 146, $C_3F_8$ with 188, $C_4F_8$ with 200, and $C_4F_{10}$ with 238, exhibits a far higher breakdown voltage under the same conditions as compared to any of these gases than would have been expected on this basis.

It has been found, further, in accordance with the present invention, that when mixed with $C_3F_8$, octafluoropropane gas, which has a boiling point of −37° C., a higher dielectric strength is obtained in the gas mixture than would have been expected from the combining of these two materials. As shown in the Fig. 3 graph, a mixture of equal parts by volume of the $C_4F_6$ and $C_3F_8$ gases has a breakdown strength higher than either $C_4F_{10}$ or $SF_6$ and higher than the expected mean of the two component gases, an improvement which is particularly marked at the wider electrode spacings, in which non-uniform field conditions can develop due to the greater divergence of the electrostatic field.

For example, at an electrode spacing of .6 inch, the dielectric strength of the 1:1 mixture of $C_4F_6$ and $C_3F_8$ is about 7% higher than the mean dielectric strength of the two gases separately. At a spacing of .8 inch, the dielectric strength of the composite medium increases to about 12% higher than the mean of the component gases. It is further evident from the graph, in view of the trend of the plotted curves, that this improved dielectric strength of the present mixture will probably be even more marked at the wider electrode spacings.

A particularly significant feature of the $C_4F_6$ component which is apparently involved in the present invention is the chemically active nature of that gas. The structure of $C_4F_6$ is $F_3C-C\equiv C-CF_3$, showing it to be a highly unsaturated compound affording reactivity toward free radicals such as F and F-containing ions and other degradation products which may be present in a fluorocarbon gas atmosphere.

In this connection it might be noted that although fluorocarbon gases as a class are electronegative in character, it has been found that this feature alone does not determine their high dielectric strength. Other characteristics present in each specific fluorocarbon gas appear to play an important part and such other characteristics may require higher voltages to be impressed before free electrons in the gas can acquire sufficient energy to initiate processes leading to electrical breakdown. The molecular characteristics of each specific gas may increase the breakdown voltage (i.e., the voltage at which the insulator becomes a conductor) by complicated phenomena, as, for example, those involving capture or attachment of free electrons by molecules.

It appears that such a function is involved in the use of the unsaturated compound $C_4F_6$ to produce the desirable results in the present improved dielectric medium. The $C_4F_6$ not only in itself may have an improved dielectric strength in view of the above considerations, but of even greater importance so far as the present invention is concerned, is that in its combination with another fluorine-containing gas such as the $C_3F_8$ disclosed herein, which affords greater economy and a lower boiling point as well as other advantages, the $C_4F_6$ confers unexpectedly higher dielectric strength to the mixture, due possibly to its high chemical reactivity and its consequent removal of free electrons, ions or radicals which would otherwise lead to breakdown of the dielectric medium under lower electrical stress.

There is thus provided by the mixture of $C_4F_6$ and $C_3F_8$ a composite gaseous dielectric medium which has a low condensing temperature and a high dielectric strength, which is thermally stable and which is economical to produce.

While the mixture of gases as illustrated in Fig. 3 is composed of equal parts by volume of $C_4F_6$ and $C_3F_8$, variations may be made in the relative proportions of the gases to obtain desired results. In general, the ranges of 5–75% by volume of the $C_4F_6$ and 95–25% of the $C_3F_8$ are preferably used for most practical purposes. The greater the proportion of $C_4F_6$, the higher the dielectric strength achieved. On the other hand, the greater the proportion of $C_3F_8$, the greater is the thermal stability of the mixture. While the illustrated mixture of equal parts of the gases has a condensing temperature of about −38° C., which is suitable for most transformer applications, the proportions may be varied as indicated in Table I below to obtain a desired condensation temperature of the mixture. Accordingly the invention is not intended to be limited to the particular ratio represented in the drawing.

The following table will serve as a guide in determining the optimum proportions of the mixture components to obtain the desired condensation temperature:

*Table I*

| Vol. percent $C_4F_6$ | 10 | 20 | 30 | 40 | 50 | 60 | 70 | 80 | 90 |
|---|---|---|---|---|---|---|---|---|---|
| Vol. Percent $C_3F_8$ | 90 | 80 | 70 | 60 | 50 | 40 | 30 | 20 | 10 |
| Condensation Temp., ° C. | −38 | −42 | −45 | −42 | −38 | −35 | −31 | −28 | −25 |
| Pressure at 27° C. | 19.1 | 19.5 | 19.7 | 19.5 | 19.1 | 18.9 | 18.6 | 18.4 | 18.1 |

As shown in the above table, a 30/70 by volume mixture of $C_4F_6$ and $C_3F_8$ respectively, has the lowest condensation temperature. In the table the gas mixtures are at 15 pounds per square inch absolute at the condensing temperature, the table also showing the corresponding pressure at 27° C. at which the transformer could be filled to obtain the above results.

The condensing point of the described gas mixture could also be adjusted by varying the charging pressure, and the following table shows the various condensing temperatures which can be achieved by pressure variation of a mixture of ⅓ $C_4F_6$ and ⅔ $C_3F_8$:

Table II

| Condensation Temperature, −T.° C. | Total Pressure at T.° C., p.s.i. (abs.) | Total Pressure at 27° C., p.s.i. (abs.) |
|---|---|---|
| 0 | 98 | 108 |
| −10 | 70 | 80 |
| −20 | 47 | 55.7 |
| −30 | 32 | 39.5 |
| −40 | 19.7 | 25.4 |
| −50 | 12.0 | 16.1 |
| −60 | 6.75 | 9.5 |

It should be realized that at the condensation temperature not much of the gas mixture will actually be precipitated because the concomitant decrease in pressure tends to reverse the process and thereby establishes a steady state. Illustrative of the advantages in using the present dielectric medium is that at −60° C. the $C_4F_6$ still exerts a vapor pressure of about 100 millimeters of mercury, which is relatively high compared with heavier molecular weight fluorocarbon of possibly comparable dielectric strength.

The present gas dielectric medium may, if desired, be further mixed with nitrogen gas, particularly under non-uniform field conditions, wherein such further mixture will provide an even higher dielectric strength especially at elevated pressure or large gap spacing, in accordance with the principles expressed in our co-pending application Serial No. 402,446, filed January 6, 1954, and assigned to the same assignee as the present application. In adding the nitrogen, the latter can be substituted for a portion of either $C_4F_6$ or $C_3F_8$ in the mixtures above-described, thereby adjusting the total pressure to a predetermined fixed value, but it is preferable to substitute it for the $C_3F_8$ in order to retain the maximum dielectric benefits of $C_4F_6$, or, the nitrogen can be added to increase the total pressure without seriously changing the dew point of the mixture.

It is also to be understood that other gases may, if desired, be used in conjunction with the described gas mixture to obtain certain desired results. For example, $SF_6$ may be incorporated in the mixture in order to provide additional positive pressure and/or low boiling point mixtures.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. An electrical apparatus comprising, in combination, a closed container, an electric device within said container and including spaced conducting parts which during operation are at unequal potential, and a gaseous electrical insulating medium in said container between said parts comprising principally a mixture of hexafluorobutyne-2 and a fluorocarbon gas having a lower condensing temperature in sufficient relative proportions to provide for substantial reaction of the hexafluorobutyne-2 with free radicals produced from decomposition of the fluorocarbon gas.

2. An electrical apparatus comprising, in combination, a closed container, an electric device within said container and including spaced conducting parts which during operation are at unequal potential, and a gaseous electrical insulating medium in said container between said parts comprising principally a mixture of hexafluorobutyne-2 and octafluoropropane in sufficient relative proportions to provide for substantial reaction of the hexafluorobutyne-2 with free radicals produced from decompression of the octafluoropropane.

3. An electric transformer comprising, in combination, a closed container, inductively-related electrical windings therein, and gaseous electrical insulating media for said windings comprising principally a mixture of hexafluorobutyne-2 and octafluoropropane in sufficient relative proportions to provide for substantial reaction of the hexafluorobutyne-2 with free radicals produced from decomposition of the octafluoropropane.

4. An electric capacitor comprising the combination of cooperating metallic armatures and interposed gaseous dielectric material, said gaseous dielectric material comprising principally a mixture of hexafluorobutyne-2 and octafluoropropane in sufficient relative proportions to provide for substantial reaction of the hexafluorobutyne-2 with free radicals produced from decomposition of the octafluoropropane.

5. An electrical apparatus comprising, in combination, a closed container, an electric device within said container and including spaced conducting parts which during operation are at unequal potential and a gaseous electrical insulating medium in said container between said parts comprising principally a mixture of about 5–75% by volume of hexafluorobutyne-2 and about 95–25% of octafluoropropane.

6. An electrical apparatus comprising in combination, a closed container, an electric device within said container and including spaced conducting parts which during operation are at unequal potential and a gaseous electrical insulating medium in said container between said parts comprising principally a mixture of hexafluorobutyne-2 and octafluoropropane in sufficient relative proportions to provide for substantial reaction of the hexaflurobutyne-2 with free radicals produced from decomposition of the octafluoropropane, and nitrogen.

7. An electrical transformer comprising, in combination, a closed container, inductively-related electrical windings therein, and gaseous insulating media for said windings comprising a gaseous mixture of equal parts by volume of hexafluorobutyne-2 and octafluoropropane.

8. An electrical insulating material comprising a gaseous mixture of about 5–75% by volume of hexafluorobutyne-2 and about 95–25% of octafluoropropane.

9. An electrical insulating material comprising a gaseous mixture of equal parts by volume of hexafluorobutyne-2 and octafluoropropane.

10. An electrical apparatus comprising, in combination, a closed container, an electric device within said container and including spaced conducting parts which during operation are at unequal potential, and a gaseous electrical insulating medium composed at least predominantly of hexafluorobutyne-2 in said container between said parts.

11. An electrical apparatus comprising, in combination, a closed container, an electric device within said container and including spaced conducting parts which during operation are at unequal potential, and a gaseous electrical insulating medium consisting essentially of hexafluorobutyne-2 in said container between said parts.

References Cited in the file of this patent

UNITED STATES PATENTS

| | | |
|---|---|---|
| 2,853,540 | Camilli | Sept. 23, 1958 |
| 2,886,625 | Wolfe | May 12, 1959 |

FOREIGN PATENTS

| | | |
|---|---|---|
| 525,244 | Great Britain | Aug. 23, 1940 |

OTHER REFERENCES

Henne: "Perfluoro-2-Butyne . . . Products," published in Journal of the American Chemical Society, volume 71, January 1949, pages 298–300.

UNITED STATES PATENT OFFICE
CERTIFICATION OF CORRECTION

Patent No. 2,957,938                 October 25, 1960

Guglielmo Camilli et al.

It is hereby certified that error appears in the above numbered patent requiring correction and that the said Letters Patent should read as corrected below.

Column 6, line 2, for "decompression" read -- decomposition --.

Signed and sealed this 13th day of June 1961.

(SEAL)
Attest:

ERNEST W. SWIDER
Attesting Officer

DAVID L. LADD
Commissioner of Patents